(12) United States Patent
Mukhi et al.

(10) Patent No.: US 11,996,096 B2
(45) Date of Patent: May 28, 2024

(54) SYSTEMS AND METHODS FOR PROVIDING PROGRAMMABLE, PERSONALIZED, AND CONVERSATIONAL COACHING IN EXTENDED REALITY LEARNING EXPERIENCE

(71) Applicant: TRANSFR Inc., New York, NY (US)

(72) Inventors: Nirmal Khubchand Mukhi, Ramsey, NJ (US); Darren Thomas McAuliffe, Austin, TX (US); Bharanidharan Rajakumar, New York, NY (US); Barry Steven Watson, Jr., Coral Springs, FL (US); Michael Joseph Colombo, Brooklyn, NY (US)

(73) Assignee: TRANSFR Inc., New York, NY (US)

( * ) Notice: Subject to any disclaimer, the term of this patent is extended or adjusted under 35 U.S.C. 154(b) by 166 days.

(21) Appl. No.: 17/324,500

(22) Filed: May 19, 2021

(65) Prior Publication Data
US 2022/0375464 A1 Nov. 24, 2022

(51) Int. Cl.
*G10L 15/22* (2006.01)
*G06F 3/01* (2006.01)
*G06T 19/00* (2011.01)

(52) U.S. Cl.
CPC .............. *G10L 15/22* (2013.01); *G06F 3/011* (2013.01); *G06T 19/006* (2013.01); *G10L 2015/223* (2013.01)

(58) Field of Classification Search
CPC ......... G10L 15/22; G10L 15/01; G10L 15/08; G10L 15/18; G10L 15/192; G10L 15/26; G10L 2015/0631–0636; G10L 2015/221–228

USPC .... 704/270.1, 275, 270, 231, 245, 255, 257, 704/258
See application file for complete search history.

(56) References Cited

U.S. PATENT DOCUMENTS

| 10,943,407 | B1 | 3/2021 | Morgan | |
|---|---|---|---|---|
| 2018/0350119 | A1* | 12/2018 | Kocharlakota | G06F 3/0483 |
| 2019/0026936 | A1* | 1/2019 | Gorur Sheshagiri | G06F 3/0304 |
| 2021/0294967 | A1* | 9/2021 | Goodsitt | G06F 21/6236 |
| 2022/0095123 | A1* | 3/2022 | Desai | H04W 16/225 |

(Continued)

FOREIGN PATENT DOCUMENTS

EP 3588469 1/2020

OTHER PUBLICATIONS

European Search Report for EP Appl. No. 22164432.1 dated Sep. 13, 2022.

*Primary Examiner* — Qi Han
(74) *Attorney, Agent, or Firm* — PEARL COHEN ZEDEK LATZER BARATZ LLP

(57) ABSTRACT

A computing system helps a user in an extended reality (XR) learning experience achieve mastery through personalized, programmable and conversational coaching. One aspect is that the XR learning experience may consist of a plurality of tasks associated with the user. A second aspect is that the XR learning experience can define different types of conversational interventions triggered by the computing system at various times. A third aspect is that some tasks or interventions can make use of a conversational assistant. A fourth aspect is that as the user is going through the XR learning experience, the system determines which, if any, interventions can be triggered based on the user's state.

18 Claims, 10 Drawing Sheets

(56) References Cited

U.S. PATENT DOCUMENTS

2022/0172633 A1* 6/2022 Jha .................... G09B 5/065

* cited by examiner

SYSTEMS AND METHODS FOR PROVIDING PROGRAMMABLE, PERSONALIZED, AND CONVERSATIONAL COACHING IN EXTENDED REALITY LEARNING EXPERIENCE

FIELD OF THE INVENTION

The present disclosure generally relates to assisting a user in an extended reality (XR) learning experience achieve mastery by providing programmable, personalized, and conversational coaching. More specifically, the invention relates to systems and methods for providing programmable, personalized, and conversation coaching in extending reality learning experience.

BACKGROUND

Extended Reality (XR) consisting of technologies such as Virtual Reality (VR), Augmented Reality (AR) and Mixed Reality (MR) continue to become more popular with hardware devices such as smartphones, VR headsets providing a means for people to work with this technology. As the technology becomes more available, its applications, including for education, are becoming more widespread.

Current state of the art for educational experiences in XR consist of highly scripted animations and interactions. For example, a medical student may be taught about human anatomy using a 3D model of a human being, allowing for interactions such as selecting a part of the anatomy to learn more about it. In some cases, XR learning experiences include assessment (where the student is tested and allowed to demonstrate mastery of the subject matter). Such experiences often include scripted or guided interactions, but not live conversational capability with an artificially intelligent agent. Additionally, the experiences are identical for all users.

This invention proposes a system that is personalized by adapting to the need of individual users, and includes the ability for live conversational tasks as well.

SUMMARY

Embodiments relate to a computing system that generates an extended reality environment for an end user. The extended reality environment may include a plurality of tasks associated with the end user. In some embodiments, the extended reality environment may include one or more additional tasks different from the plurality of tasks, and each of the one or more additional tasks may appear within the extended reality environment. In some embodiments, the one or more additional tasks appearing within the extended reality environment may include at least one of one or more audible directions, one or more animations, and one or more rendering of models associated with the activities taken by the end user. In alternate embodiments, the extended reality environment may further include one or more questions asked to the end user, and each of the one or more questions may appear within the extended reality environment. The computing system may receive input data from an extended reality system associated with the end user. In some embodiments, the input data may include one or more event data associated with actions taken by the end user in the extended reality environment.

The computing system may determine one or more conversational interventions in the extended reality environment in accordance with one or more triggering events. In some embodiments, the triggering events may be based at least in parts on a level of engagement of the end user, a level of subskill mastery, a level of completion of a particular task, or some combination thereof.

In some embodiments, the computing system may determine one or more conversational interventions in the extended reality environment, in accordance with one or more triggering events by setting one or more triggering criteria for each of the one or more event data associated with actions taken by the end user in the extended reality environment and determining whether a current learning state associated with the end user is below a threshold value of the one or more triggering criteria.

In alternate embodiments, the computing system may determine one or more conversational interventions in the extended reality environment in accordance with the one or more triggering events based on determining whether one of the plurality of tasks performed by the end user in the extended reality environment was successfully completed in comparison with the received input data from the external reality system.

The computing system may receive a voice command from the end user. In some embodiments, the voice command may correspond to a statement uttered by the end user within the extended reality environment. The computing system may process the voice command to generate a response to the voice command. The computing system may cause the response and the one or more conversational interventions to appear within the extended reality environment as an audible response to the voice command. In some embodiments, the one or more event data associated with actions taken by the end user in the extended reality environment can be determined based on the generated response to the voice command.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements. The teachings of the embodiments can be readily understood by considering the following detailed description in conjunction with the accompanying drawings.

Figure 1:
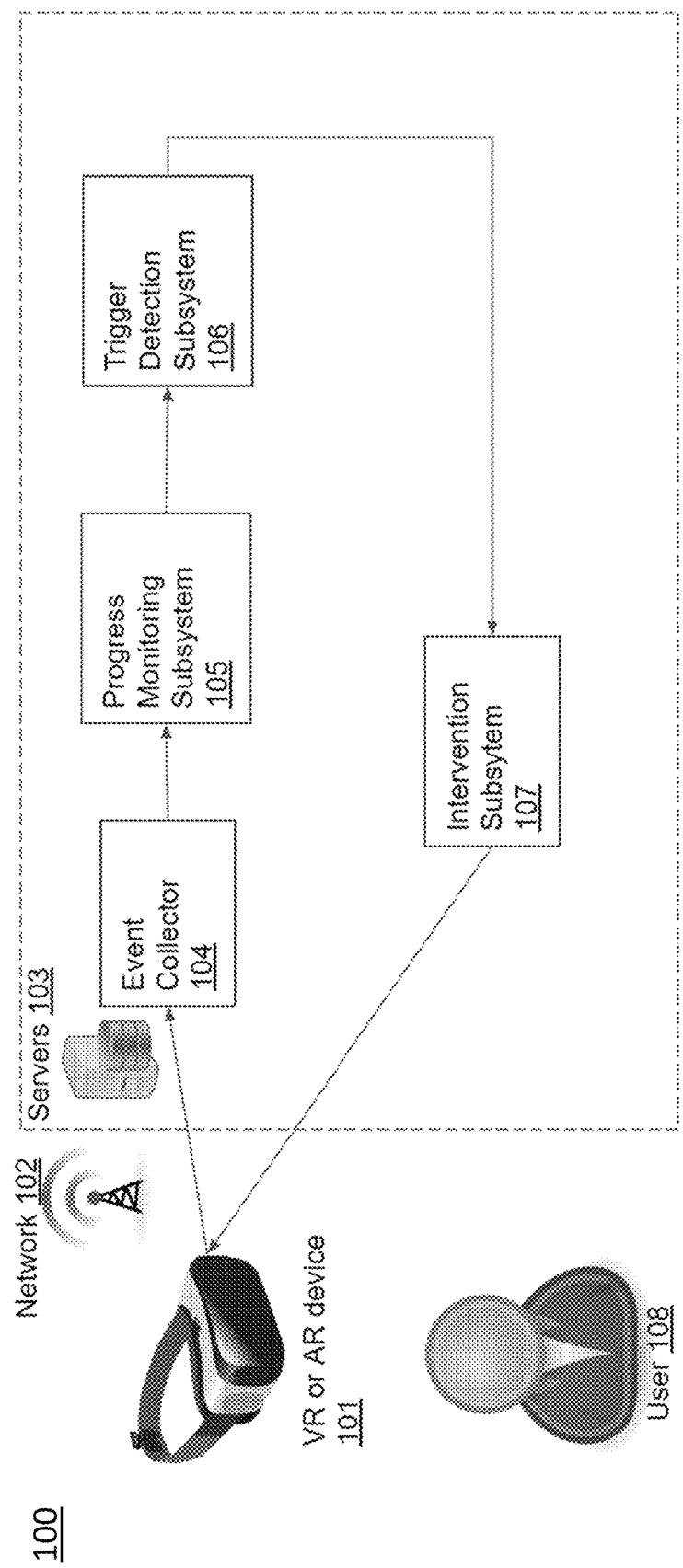
FIG. 1 is a computing system that provides personalized and conversational coaching within an Extended Reality (XR) learning experience, in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments are described herein with reference to the figures where like reference numbers indicate identical or functionally similar elements. Also, in the figures, the left most digits of each reference number correspond to the figure in which the reference number is first used.

The present disclosure may relate to helping a user in an extended reality (XR) learning experience achieve mastery through personalized, programmable and conversational coaching. One aspect is that, in some embodiments, the XR learning experience may consist of a set of tasks. A second aspect is that, in some embodiments, the designer of the XR learning experience can define different types of conversational interventions to be triggered at appropriate times. A third aspect is that, in some embodiments, some tasks or interventions can make use of a conversational assistant. As described herein, the conversational assistant may be an avatar within the XR environment that acts as the coach for the XR learning experience. A fourth aspect is that, in some embodiments, as the user is going through the XR learning experience, the system determines which, if any, interventions can be triggered based on the user's state.

A designer typically uses a computing system that communicates with a processing device to define an XR learning experience as a set of tasks and interventions. These are activities that collectively help the user be exposed to subject matter and interactions with the environment that help the user learn. Some tasks may consist of scripted voiceovers, animations, conversational assessments, etc. Some tasks may require one or more actions by a user or other types of interactions within the XR learning experience. Tasks may have a lifecycle consisting, for example, of a start, an execution phase (e.g., where the scripted voiceovers or animations play, or the system waits until the user performs an interaction) and an end (e.g., as indicated in the script created by the designer and programmed into the system), at which point the task is completed. Tasks may be required and/or optional according to various embodiments. Required tasks need to be completed by the user in order to progress through the learning experience to the next task or to the completion of the learning experience. Optional tasks do not need to be completed, but may be completed. Such optional tasks may be used as a part of an intervention, which may insert a new task for the user to complete before proceeding through the rest of the learning experience. A conversational task is a special type of task involving interaction with an artificially intelligent coach within the XR environment. A conversational intervention is an intervention in which a conversational task is used. Each task can end in success or failure, as determined by a set of conditions specified by the designer. These success/failure conditions are referred to as success criteria. Designers can also use processing logic to associate each task with success criteria defined using events within the XR learning experience. In some embodiments, each intervention may consist of a first transition event, one or more tasks for the end user and a second transition event back to the remaining tasks in the XR learning experience. The XR learning experience may be stored in a database of a computing system located within a VR or AR device or otherwise associated with the VR or AR device.

Embodiments herein are described in the context of a VR or AR device. Such devices may be capable of tracking a user's physical orientation and/or movements within a virtual or augmented reality environment. A virtual environment consists of a rendering of a three-dimensional (3D) space with 3D objects in it, in a manner that looks and sounds like a real-world environment. Such an environment is rendered and able to be experienced by a user through, e.g., a VR device. An augmented environment superimposes virtual 3D models in the real world when viewed through an appropriate device such as a cell phone. In this way, the user experiences an augmented version of the real world. Additionally, such devices may include input controllers. Within VR or AR environments, virtual objects can be touched, moved and generally interacted with in a manner and using natural physical interactions similar to the real world. Such interactions are generally enabled through input controllers, which are held by the user in each hand as they manipulate virtual objects. Additionally, VR and AR devices may also include means to track the user's gaze. For example, as the user turns their head to the right, a VR headset may include head tracking capability which will determine the extent of the user's movement and change the rendering of objects in the virtual environment to match their orientation. VR and AR devices may be connected to a wireless network and can thus transmit data to other devices on the wireless network.

In some embodiments, the VR or AR device on which the experience is played can send events to the processing device in response to one or more actions taken by the user. Some examples of events may include virtually picking up an object in the VR/AR environment, shifting the user's gaze in the environment, etc. The processing logic may use these events to evaluate success or failure of tasks. The processing logic may also or alternatively use the events to compute the end user's level of mastery on specific aspects of the topic of learning, as well as a level of engagement with the objects within the XR environment, as defined herein. Task success/failure, mastery data as well as engagement data can be stored in a database.

In some embodiments, the computing system may include an intervention subsystem. This component may use the task results, mastery data and engagement data to evaluate triggers to determine if a coaching intervention is appropriate for the end user.

In some embodiments, a task may include a conversational assessment. The VR or AR device can produce an audible question, e.g., posed by a coach avatar within the environment. The user may respond to the question verbally, and the verbal response may be translated by the processor using, for example, speech recognition software. The user may also respond to the question through non-verbal actions, which may be detected by the processor and interpreted as responses. For example, the coach avatar may ask the user "Pick up the type of handsaw that would be used for cutting against the grain of a workpiece." The user may respond by picking up the crosscut saw (which would be the correct answer). If the user picks up any other type of saw, it would be an incorrect response as understood by the processor.

In some embodiments, the user's verbal utterance may be sent to a computing system within the VR or AR device. The verbal utterance may be converted into text using Automated Speech Recognition (ASR) technology.

As described herein, a conversational assistant may be an avatar within the XR environment that acts as the coach for the XR learning experience. Throughout the XR learning experience, the user may receive instruction and/or guidance from the coach and the user may also be assessed through the conversational assistant. For example, with reference to FIG. 2 described below, in the task "Use drill to tighten screw", the conversational assistant would introduce the task to the user by saying "OK, now let us test the drill to make sure the rewiring worked. Pick up the drill and use it to tighten the screw that is set up against the workpiece." If the user does not pick up the drill within a set period of time, say 10 seconds, the conversational assistant may remind the user to pick up the drill by saying "The drill is on the table. I have highlighted it for you. Use the grip button on your controller to pick it up." After the user picks up the drill, the conversational assistant may guide the user to perform the correct action by, for example, saying "First find the correct sized drill bit for this screw" and the user may be presented with a variety of drill bits. In this manner, the conversational assistant may guide the user each step of the way, and events relating to their interactions and the number of hints they received may be used to compute success or failure of the task. In some embodiments, other guidance may be additionally or alternatively provided, such as, for example, non-verbal audio cues, visual cues, haptic feedback cues, etc.

As explained, in some embodiments, the conversational assistant may be able to pose questions, or answer questions posed by the user in the context of working on a task. The text may be matched against the expected correct answer using, e.g., a text classification model. If the answer matches and is deemed correct, the task may be marked as successfully completed, otherwise, it is unsuccessfully completed.

Automated Speech Recognition (ASR) technology is a field of artificial intelligence, computer science and linguistics that is concerned with the transformation of speech audio input into its text representative of that speech. Natural Language Understanding (NLU) technology is a field of artificial intelligence, computer science and linguistics concerned with the interpretation of textual data, for purposes such as entity extraction, intent classification, and other applications.

FIG. 1 is a computing system 100 that provides personalized and conversational coaching within an XR learning experience, in accordance with one embodiment. As shown, data from the VR or AR device 101 related to the movement, interactions and physical orientation of the user 108 are sent over the network 102 to the servers 103 that run the components of the computing system 100 for personalized and conversational coaching. In some embodiments, the components run on a single server that contains CPU, storage and other computing hardware. In other embodiments, the components may run on multiple servers to distribute the load on the computing hardware afforded by the servers. In some embodiments, the components shown herein may be decomposed into smaller functional units responsible for part of the processing logic within each component. In some embodiments, the components shown herein may be combined into larger functional units responsible for the processing logic of two or more components in the computing system 100.

In some embodiments, each object within the VR or AR device 101 may be associated with one or more states, including, but not restricted to, one or more current states of each object, a position of the user as represented in the 3D space, and information pertaining to the number of audio or video hints provided to the user trying to accomplish a task. The data from the VR or AR device 101 may be received by an Event Collector 104 which may store the data and make the data available to a Progress Monitoring Subsystem 105. The VR or AR device 101 may also send audio data such as a verbal utterance by the user to the computing system 100 through the same network as is used for the user data. The Progress Monitoring Subsystem 105 may be configured to update one or more database that stores mastery information and engagement information pertaining to the user's progress through the learning. A Trigger Detection Subsystem 106 may be configured to check the database against an Experience Definition (as described in detail below with reference to FIG. 2) to determine if any interventions can be triggered based on the current learning state, or if the experience should just continue to the next task. If an intervention is triggered, it may be executed by an Intervention Subsystem 107, which will follow the design provided in an Intervention Definition (as described in detail below with reference to FIG. 4) to move the user to a different task based on their progress and current learning state. The next task may be experienced by the user through the VR or AR device 101 to help the user continue to learn.

Figure 2:
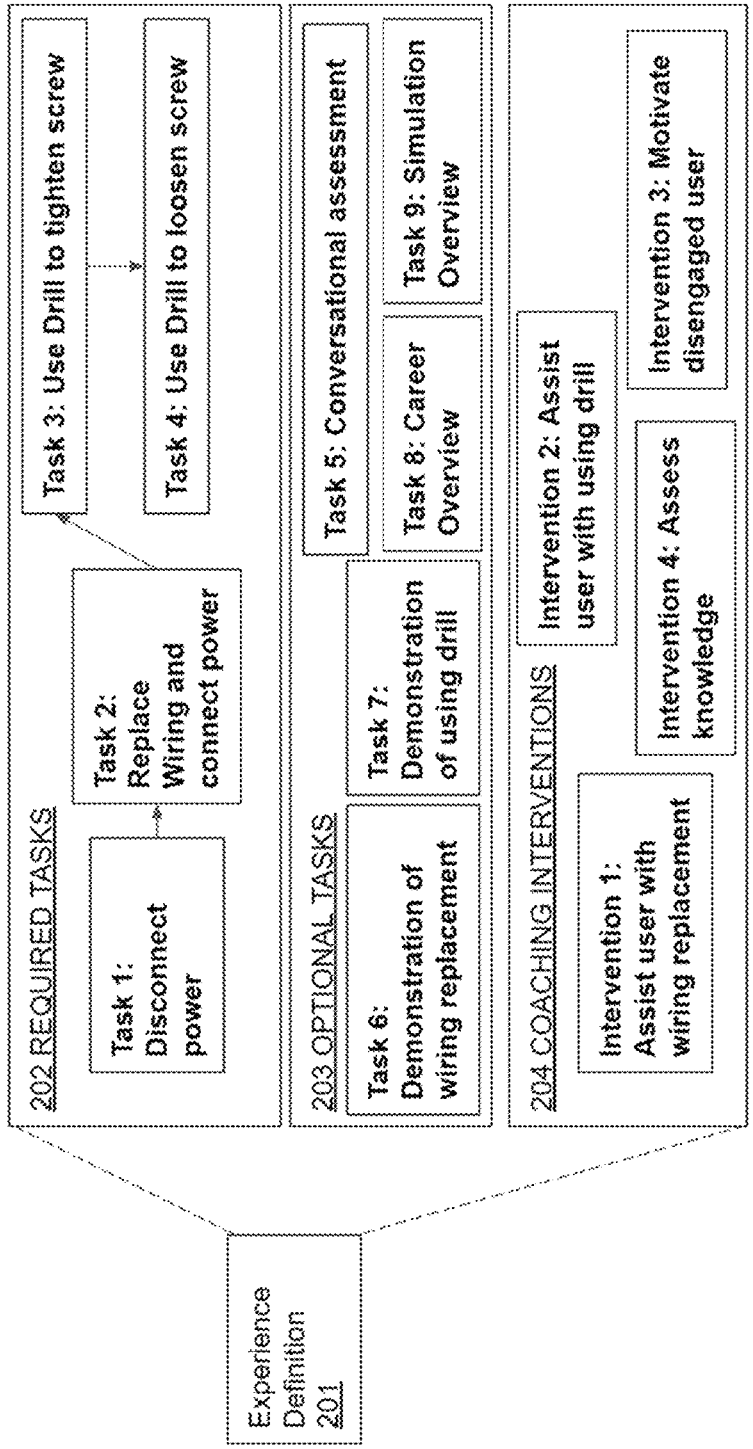
FIG. 2 is a system for describing the XR learning experience of FIG. 1, in accordance with one embodiment.

FIG. 2 is a system 200 for describing the XR learning experience of FIG. 1, in accordance with at least one example embodiment. The system 200 may be a portion of the computing system 100 of FIG. 1. The system 200 may include an experience definition 201 which may consist of one or more required tasks 202, one or more optional tasks 203 and one or more coaching interventions 204. The experience definition 201 may be a feature associated with the XR learning experience of the VR or AR device 101.

The required tasks 202 may be connected to each other to reflect the sequence in which they are presented to the user through the VR or AR device 101. As shown in FIG. 2, the required tasks 202 may describe, for example, an XR learning experience related to teaching a user to repair the wiring of an electric drill and test the wiring of the electric drill. The system 200 may consist of four required tasks: Task 1 (learning how to disconnect power from the drill), Task 2 (rewiring the drill and connecting power), Task 3 (using the drill to tighten a screw) and Task 4 (using a drill to loosen a screw). Of course, in other embodiments, more or less tasks may be required. As shown in FIG. 2, the XR learning experience of the experience definition 201 may also include one or more optional tasks 203, and/or one or more coaching interventions 204. In one example, the optional tasks 203 may include: Task 5 (Conversational assessment), Task 6 (demonstration of wiring replacement), Task 7 (Demonstration of using drill), Task 8 (Career Overview), and Task 9 (Simulation Overview). In another example, the coaching interventions 204 may include: Intervention 1 (Assist user with wiring replacement), Intervention 2 (Assist user with using drill), Intervention 3 (Motivate disengaged user) and Intervention 4 (Assess knowledge).

In some embodiments, the computing system 100 of FIG. 1 may allow designers to include the conversational assessment in the XR learning experience. The computing system 100 may allow designers to include the conversational assessment in various ways: it can be a required task needed to be passed to complete learning, or it can be an optional task used to evaluate a specific deficiency the user has shown in their earlier work. In some examples, the conversational assessment may be a required task. In alternate examples, the conversational assessment may be an optional task.

As the user conducts activities within the XR environment, such as watching the conversational coach, watching an animation, or interacting with objects as directed, their level of engagement in these tasks may be measured, e.g., on a scale of 0 to 1. A value of 0 would represent a completely disengaged user, while a value of 1 would represent a user who is fully engaged. Of course, other measures and/or scales may be used in various embodiments. The engagement may be measured based on the events sent by the VR headset. For example, if the user's gaze is fixed on a direction that is away from where an animation is teaching the user something, or if the user is given an instruction (for example, picking up a tool) that the user is not following, then engagement goes down. If the events sent reflect the user following directions, e.g., having their gaze fixed in the right direction and not idling (i.e., doing nothing), then engagement goes up.

In addition to engagement, another metric that may be monitored is mastery. Mastery is associated with the user demonstrating competency in a particular skill. Skills may be defined in a hierarchy, and so may be composed of subskills. As the user goes through the learning experience, successful completion of tasks will result in mastery increases, while unsuccessful completion of tasks will decrease mastery. Mastery may also be measured using a method called Bayesian Knowledge Tracing (BKT) in which mastery is represented on a scale from 0 to 1. A value of 0 represents that the user has no chance at all of successfully completing a random task where the skill being measured is applied. A value of 1 represents complete confidence in the ability of the user to successfully apply the skill being measured.

Figure 3:
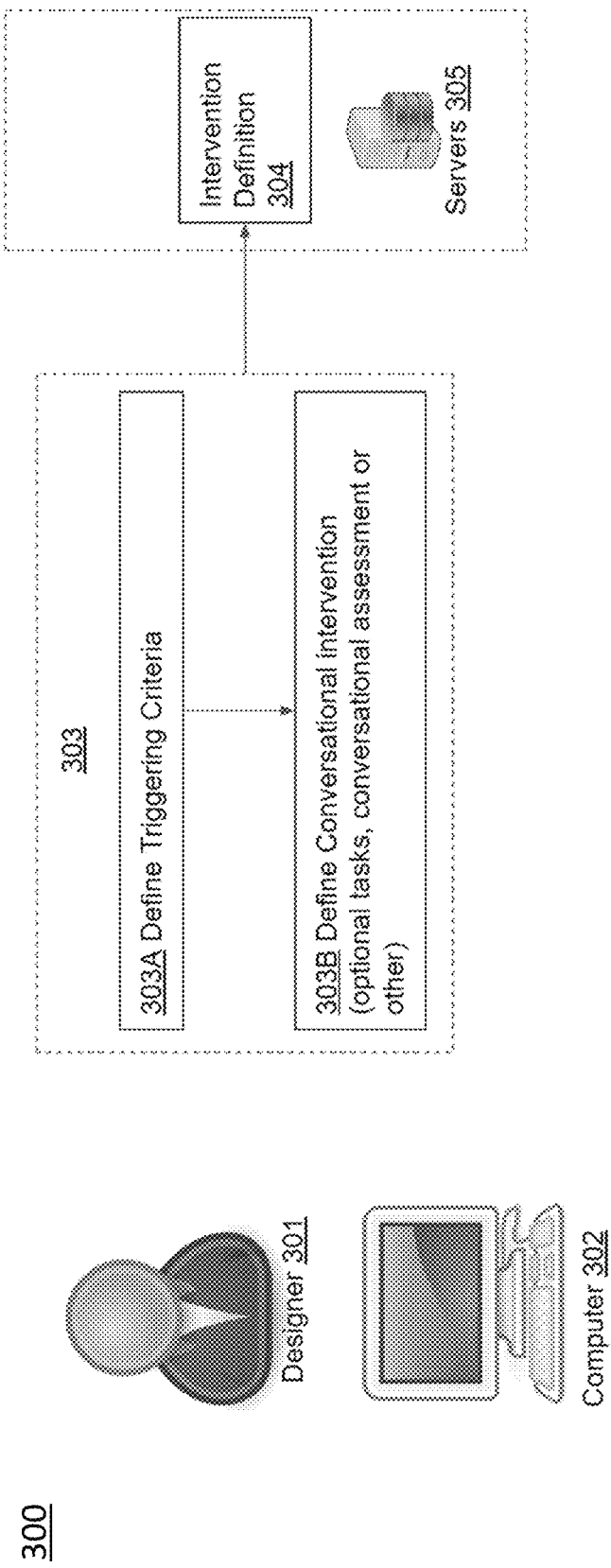
FIG. 3 is a system for creating a learning intervention using the system of FIG. 1, in accordance with one embodiment.

FIG. 3 is a system 300 for creating a learning intervention using the system of FIG. 1, in accordance with at least one embodiment. The system 300 may be a portion of the computing system 100 of FIG. 1. As shown in FIG. 3, a learning experience designer 301 may use a computer 302 to author an intervention definition 304. The intervention definition 304 may include, e.g., two steps: (1) defining a triggering criteria 303A and (2) defining one or more conversational interventions 303B. The triggering criteria 303A may include at least one of: one or more levels of engagement, one or more levels of subskill mastery, one or more levels of completion of tasks associated with a user of the VR or AR device 101.

In some embodiments, the conversational intervention 303B may include one or more optional tasks, one or more conversational assessments, one or more required tasks, or some combination thereof. The intervention definition 304 may be a result of the intervention definition 304 stored in a database (not shown here) of one or more servers 305.

Figure 4:
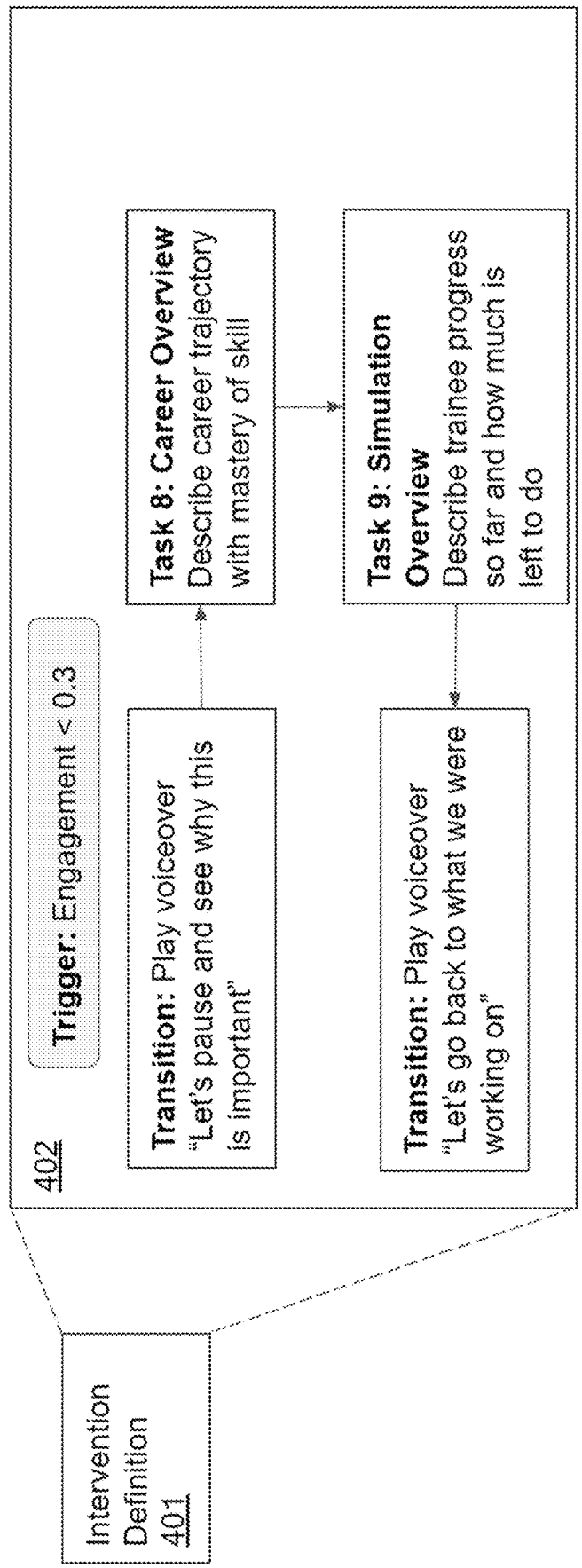
FIG. 4 is an example of a first learning intervention, in accordance with one embodiment.

FIG. 4 is an example of a first learning intervention 401, in accordance with at least one embodiment. The first learning intervention 401 may be triggered, e.g., by the Intervention Subsystem 107 of FIG. 1 when the user's engagement level drops below a defined threshold value. In some embodiments, the engagement level may be measured, for example, on a scale of 0 to 1, and a level of engagement of the user may be 0.3 as shown in 402, which may be the threshold defined for a disengaged user. When this intervention gets triggered by the Intervention subsystem 107, the user may be presented, e.g., with a transition voiceover, followed by one or more optional tasks (e.g., Task 8 and Task 9 described above with reference to FIG. 2). These optional tasks serve to intervene and address the deficiency in the current learning state of the user, which in this example is motivating the user and keeping them engaged. Task 8 describes the types of careers they could have if the user masters repairing an electric drill (the skill learnt). Task 9 informs the user of the progress made to this point. The intervention closes with another transition voiceover where the user is prepped to go back to the previous task.

Figure 5:
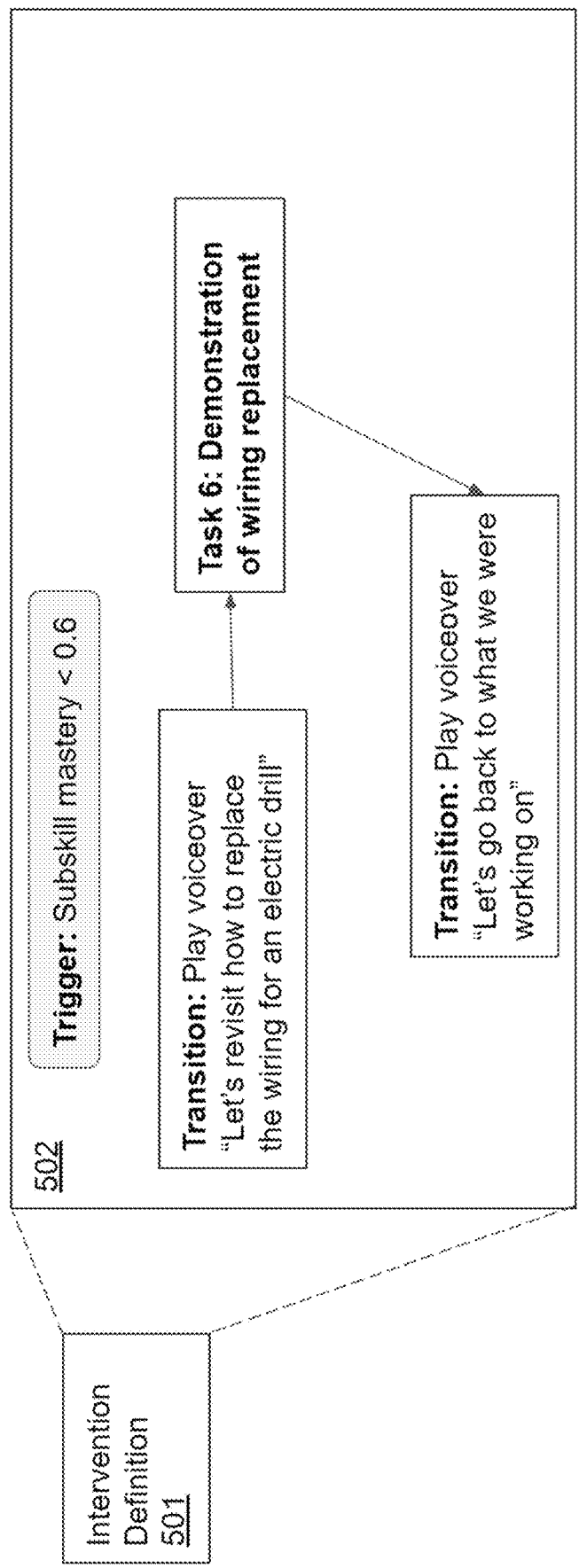
FIG. 5 is an example of a second learning intervention, in accordance with one embodiment.

FIG. 5 is an example of a second learning intervention 501, in accordance with at least one embodiment. Referring to FIG. 2, Intervention 1 ("Assist user with wiring replacement") is described herein. The intervention may be triggered when the user's mastery level on a skill drops below a defined threshold. In at least one embodiment, the subskill mastery level may be measured on a scale of 0 to 1, and a level of 0.6 as shown in 502 is the threshold defined for a user who needs assistance. As the user completes tasks in the XR learning experience, the mastery data may be updated, and this intervention can be triggered by the Intervention Subsystem 107 described above with reference to FIG. 1. The user may be presented with a transition voiceover, followed by Task 8 and Task 9, which are the optional tasks 203 in the XR learning experience definition of FIG. 2. The optional tasks 203 may serve to intervene and address the deficiency in the user's learning state, which in this example is motivating the user and keeping the user engaged. Task 8 describes the types of careers the user could have if the user masters repairing an electric drill, the skill that the XR learning experience is teaching the user. Task 9 informs the user of the progress made to the current instance of time. The intervention closes with another transition voiceover where the user is prepped to go back to the current task the user was working on.

Figure 6A:
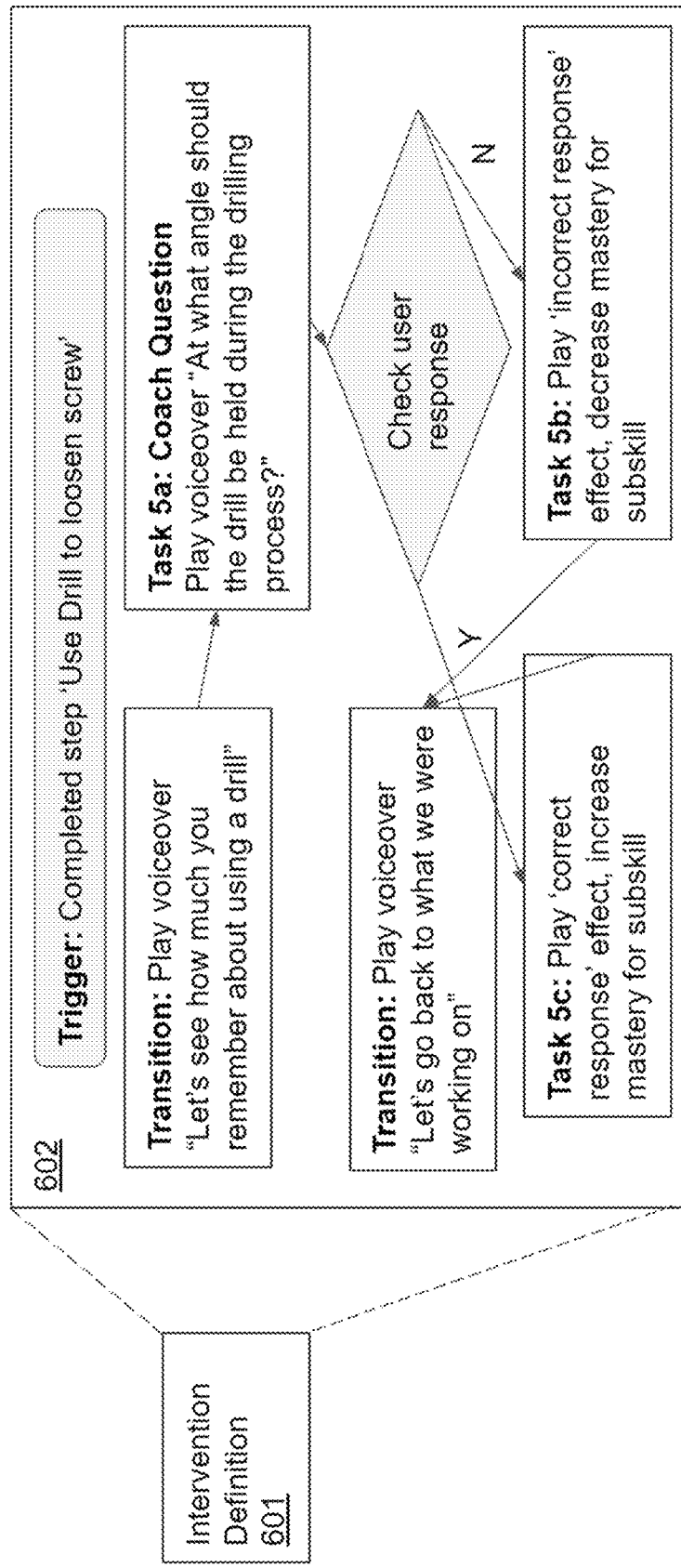
FIG. 6A is an example of a third learning intervention, in accordance with one embodiment.

FIG. 6a is an example of a third learning intervention 601. Referring to FIG. 2, Intervention 4 ("Assess knowledge") is described herein. As shown in 602, the designer has defined this intervention to trigger on completion of Task 4 ("Use drill to loosen screw"). As the user completes tasks in the XR learning experience, the user's progress data is updated, and this intervention may get triggered by the Intervention Subsystem 107 described above with reference to FIG. 1. The user may be presented with a transition voiceover, followed by Task 5 Conversational Assessment described above with reference to FIG. 2 (note the Task 5 is broken down in FIG. 6A into Tasks 5a, 5b and 5c). This task presents a conversational assessment to the user to test the knowledge of the user. It should be noted that none of the prior art allows the designer to include a conversational assessment (e.g., Task 5) within the XR learning experience.

Figure 6B:
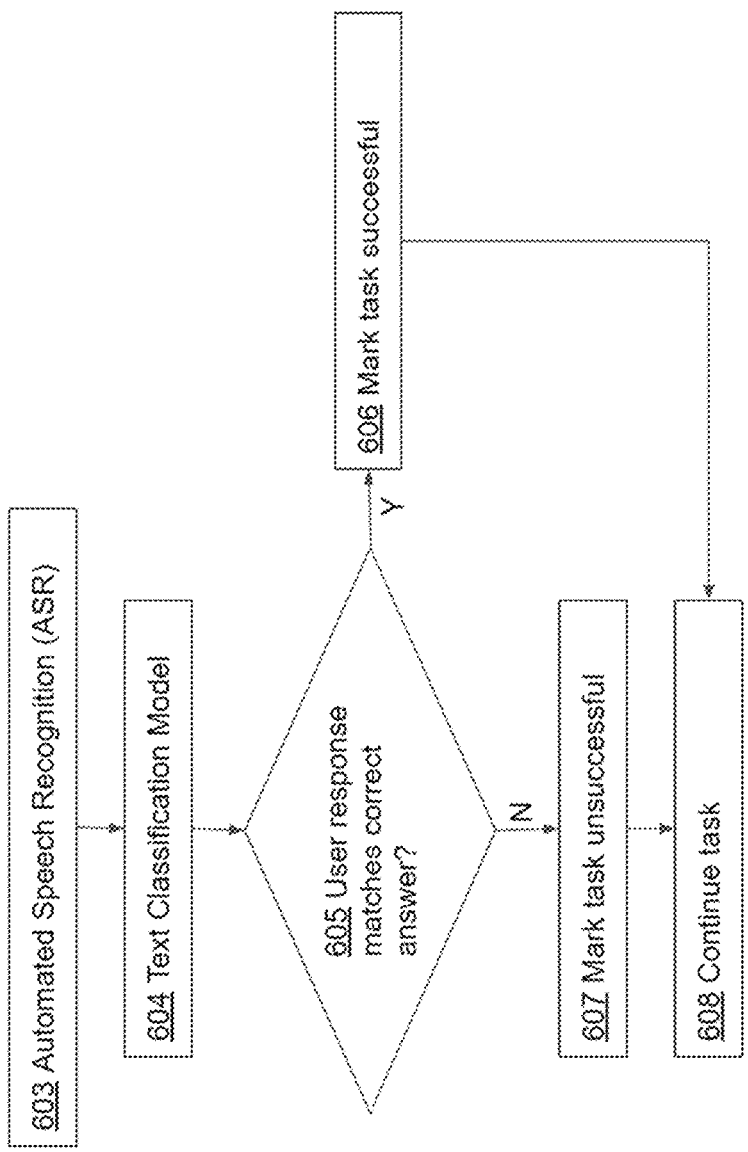
FIG. 6B is an illustration showing how the user's verbal response is processed by the computing system of FIG. 1, in accordance with one embodiment.

FIG. 6b is an example illustration showing how the user's verbal response may be processed by the computing system 100 of FIG. 1 according to at least one embodiment. The audio sent by the VR or AR device 101 may be received, e.g., by the Automated Speech Recognition (ASR) component 603 located within the computing system 100, which converts the user's verbal response into text. This text is compared with an expected answer by a text classification model 604, e.g., based on using Natural Language Understanding (NLU) technology, which determines correctness of the response when compared with a reference answer 605. If the user is correct 606, a mastery data is updated by the by the computing system 100 to reflect successful execution of the current task. Otherwise, the unsuccessful execution 607 is reflected in the data updated by the computing system 100. Returning to the intervention definition 602 described with reference to FIG. 6A, the user is presented with Task 5b or 5c depending on correctness of the user's response, followed by a transition which may then let the user continue 608 with the XR learning experience following the learning intervention.

Figure 7A:
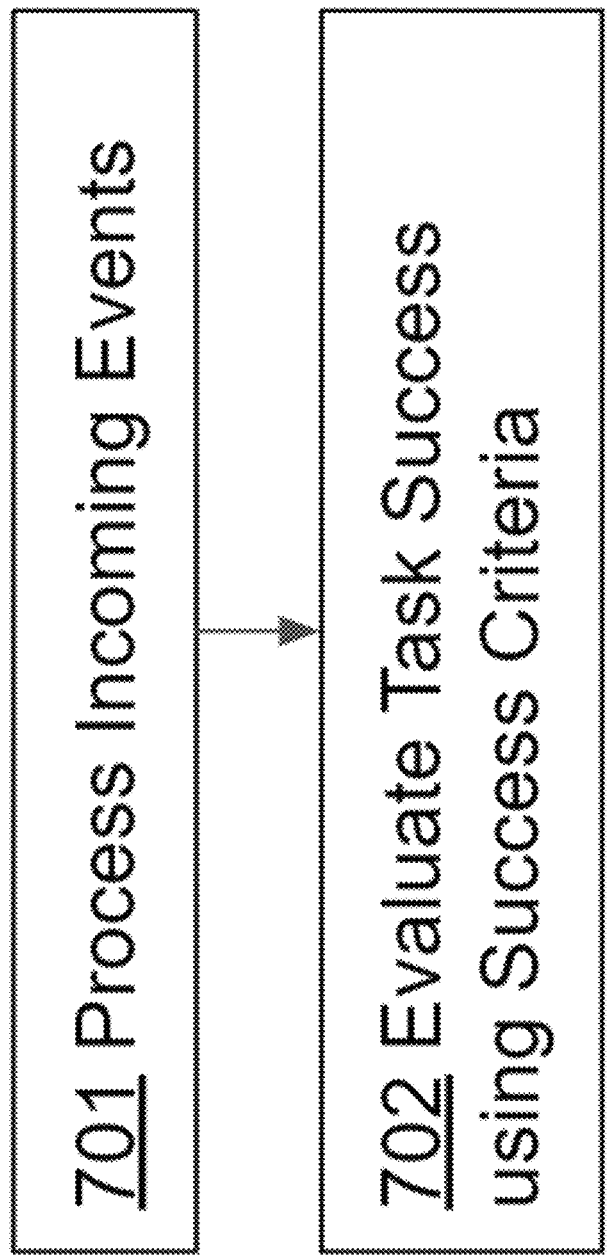
FIG. 7A is an illustration showing the flow of information through the Progress Monitoring Subsystem of FIG. 1, in accordance with one embodiment.

FIG. 7a is an illustration showing the flow 700A of information through the Progress Monitoring Subsystem 105 of FIG. 1, in accordance with at least one embodiment. In some embodiments, the Progress Monitoring Subsystem 105 may receive 701 incoming events, followed by determining a current task (not shown here). In some embodiments, the Progress Monitoring Subsystem 105 may evaluate 702 the success criteria of the current task against a task definition (as described below with respect to FIG. 7B) to determine a resulting task success or failure, calculated mastery and engagement which may be stored in a database located within the Progress Monitoring Subsystem 105.

Figure 7B:
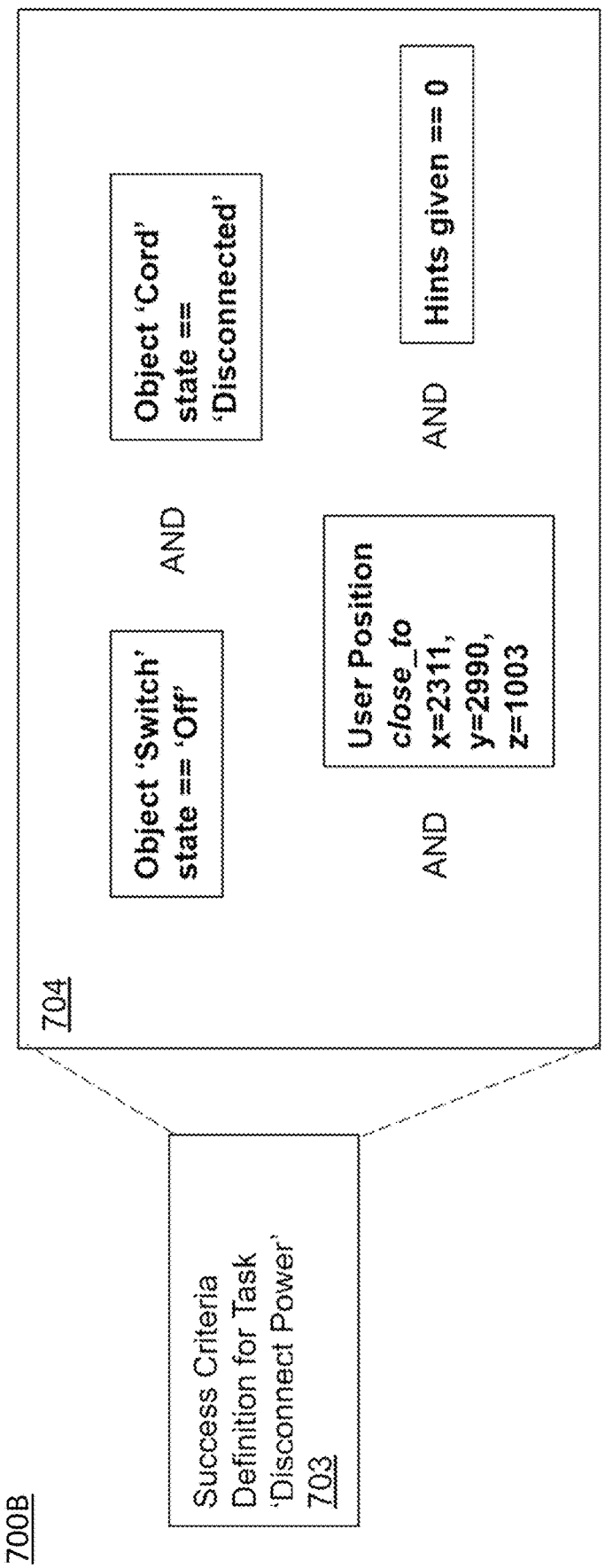
FIG. 7B is an example for definition of a success criteria of a task, in accordance with one embodiment.

FIG. 7b is an example for definition of a success criteria of a task, in accordance with at least one embodiment. The example shown herein is that of Task 1 ("Disconnect Power") within the experience definition 201 of FIG. 2. The designer may specify a script associated with each task, as well as success criteria so that the computing system 100 can determine if the task was successfully completed or not. As shown in FIG. 7b, the success criteria 703 may consist of, e.g., four independent clauses 704 all of which are required to be fulfilled in order for the task to be marked as successfully completed. The four independent clauses 704 may relate to one or more states of objects in an XR environment, one or more positions of a user in the XR environment, a number of hints that a coach has provided them with, or some combination thereof.

While FIG. 7b shows an example with Task 1 ("Disconnect Power"), there are multiple examples corresponding to other scenarios. In a first example, the task may be related to selection of personal protective equipment (PPE) within the computing system 100 described above with reference to FIG. 1. The PPE selection may be a task within a "Handsaw" learning experience which can teach safe and accurate use of a handsaw. In this task, the users may be presented with a set of PPE, including but not restricted to, safety goggles, dust mask, hard hat, gloves, ear plugs and protective clothing. The users may have to select only the equipment the users would use on a construction site when using a handsaw. Each item of PPE may be in a predefined state, for example, "donned" or "on_table," which may be recorded or otherwise tracked in a database of computer system 100. When an item changes state, an event may be sent to the backend system, and on completion of the step, the success criteria may be evaluated by the computing system 100. The task is successful only if the correct items (hard hat, safety goggles and gloves) are donned. Therefore, the success criteria for this scenario may be as follows:

Object "safety goggles" state==, "donned" AND Object "gloves" state==, "donned" AND Object "hard hat" state==, "donned" AND Object "ear plugs" state==, "on_table" AND Object "dust mask" state==, "on_table" AND Object "protective clothing" state==, "on_table"

In the example "Handsaw" learning experience described herein, at the end of the task, a coach within the XR learning experience may pose the question: "If you need to lift a heavy load on a 90 degree day, what type of sling should you use?" After the user responds, an audio may be sent to the system by the VR or AR device 101, where the audio may be converted into text, and may be run through a text classification algorithm to check if it matches any of the expected answers (e.g., "chain sling" or "wire rope cable," etc.). If the answer is correct, the user has successfully completed the task. This example shows the conversational assessment as one of the required tasks 202 of FIG. 2 according to some embodiments.

In a second example, a "saw selection" task may be within the "Handsaw" learning experience of the computing system 100. In this task, a user may be asked to demonstrate that they know how to select the correct saw based on the direction of the cut the user is asked to make. The user may be presented with, for example, two saws: a crosscut saw (possible states: "hung_on_board" or "picked_up") and a ripsaw (possible states: "hung_on_board" or "picked_up"). The user may be presented with a board and asked to cut across the grain. The task may be successful if the user only picks up the crosscut saw. Therefore, the success criteria for this scenario may be:

Object "crosscut saw" state==, "picked_up" AND Object "ripsaw" state==, "hung_on_board"

In a third example, a "chain sling inspection" task may be a task within the "Introduction to Rigging" learning experience of the computing system 100. The task may teach trainees how to use equipment for rigging and moving heavy loads at an outdoor construction site. In this task, a user may be presented with five chain slings, which have an equal chance of having damage or being safe to use. The user may have to determine if a chain sling is damaged or safe. The computing system 100 may count the number of correct answers (e.g., object "num_correct_answers", with possible values between 0 and 5, for example) and send this as an event to the computing system 100. In this example, if the user takes longer than 5 seconds to answer, they are given a hint. The number of hints used may also be sent as an event to the computing system 100. The task may be successful if the user gets at least three answers correct, with maximum 1 hint used. Therefore, the success criteria can be:

Object "num_correct_answers" value>=3 AND Hints given<=1

In a fourth example, a "break line identification" may be a task within an "Introduction to Blueprint Reading" learning experience of the computing system 100. The user may be provided with a blueprint for a car, with various types of line types such as object lines, hidden lines, section lines, break lines, extension lines, etc. marked on the blueprint. All lines can be in one of two states: selected or unselected. The computing system 100 may allow the user to only select one line. The user may be asked to identify any break line, and they are marked correct if they get the answer without using any hints. Therefore, the success criteria can be:

Object "break line" state==, "selected" AND Hints given==0

In the "Introduction to Blueprint Reading" learning experience described herein, if a user did not select the break line correctly (i.e., their mastery on the "break line" subskill is <0.5), the computing system 100 may be configured to transition to an optional task, e.g., to check if the user remembers what a break line is by asking the user a question: "Let me try to help you. Do you remember what type of line is used to denote a break line in an engineering drawing?". Here, the computing system 100 is configured to check if the verbal response matches "Thick, jagged line". If so, the task may be completed successfully. If not, the task is unsuccessfully completed. The computing system 100 may continue the intervention by showing an example of a break line and reminding the user of how it looks. This example shows the conversational assessment as one of the optional tasks 203 of FIG. 2.

Figure 8:
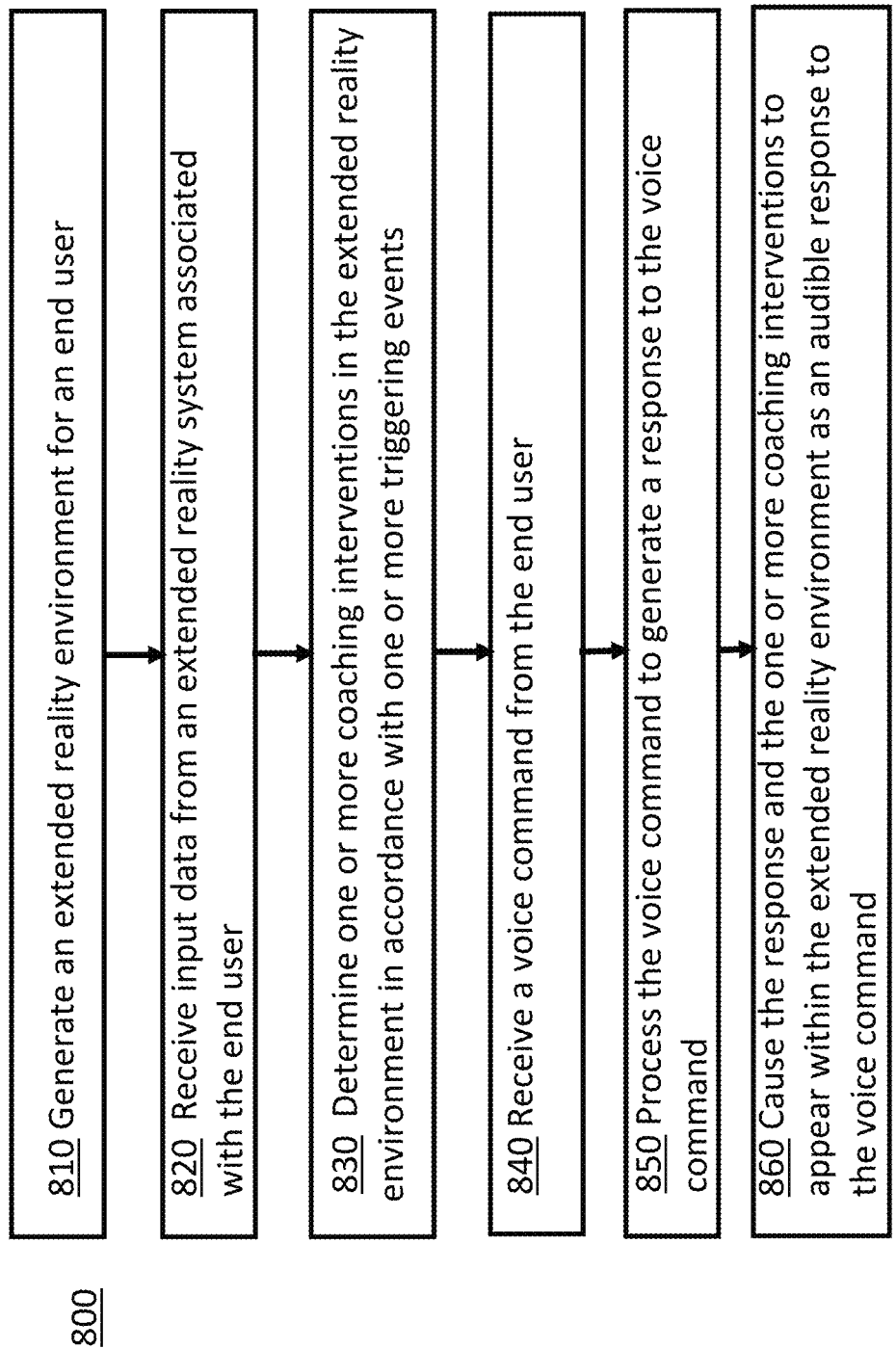
FIG. 8 is a flow diagram that shows providing programmable, personalized, and conversational coaching, in accordance with one embodiment.

FIG. 8 is a flow chart 800 illustrating steps for providing programmable, personalized, and conversational coaching, in accordance with at least one embodiment.

In various embodiments, the computing system 100 be configured to generate 810 an extended reality environment for an end user. In some embodiments, the extended reality environment may include a plurality of tasks associated with the end user. For example, the plurality of tasks may include one or more required tasks 202 and one or more optional tasks 203 described above with reference to FIG. 2.

In some embodiments, the extended reality environment may include one or more additional tasks different from the plurality of tasks, and each of the one or more additional tasks may appear within the extended reality environment. In some embodiments, the one or more additional tasks appearing within the extended reality environment may include at least one of one or more audible directions, one or more animations, and one or more rendering of models associated with the activities taken by the end user, as described herein. In alternate embodiments, the extended reality environment may further include one or more questions asked to the end user, and each of the one or more questions may appear within the extended reality environment.

In some embodiments, the computing system 100 may be configured to receive 820 input data from an extended reality system associated with the end user. In some embodiments, the input data may include one or more event data associated with actions taken by the end user in the extended reality environment.

In some embodiments, the computing system 100 may be configured to determine 830 one or more conversational interventions in the extended reality environment in accordance with one or more triggering events. In some embodiments, the triggering events may be based at least in parts on a level of engagement of the end user, a level of subskill mastery, a level of completion of a particular task, or some combination thereof.

In some embodiments, the computing system 100 may be configured to determine 830 one or more conversational interventions in the extended reality environment, in accordance with one or more triggering events, e.g., by setting one or more triggering criteria for each of the one or more event data associated with actions taken by the end user in the extended reality environment and determining whether a current learning state associated with the end user is below a threshold value of the one or more triggering criteria. In one example, the triggering event may be based on the level of engagement being above a threshold value of 0.3.

In alternate embodiments, the computing system 100 may be configured to determine one or more conversational interventions in the extended reality environment in accordance with the one or more triggering events based on determining whether one of the plurality of tasks performed by the end user in the extended reality environment was successfully completed in comparison with the received input data from the external reality system.

In some embodiments, the computing system 100 may be configured to receive 840 a voice command from the end user. In some embodiments, the voice command may correspond to a statement uttered by the end user within the extended reality environment. The computing system 100 processes 850 the voice command to generate a response to the voice command.

In some embodiments, the computing system 100 may be configured to cause 860 the response and the one or more conversational interventions to appear within the extended reality environment as an audible response to the voice command. In some embodiments, the one or more event data associated with actions taken by the end user in the extended reality environment can be determined based on the generated response to the voice command.

It is appreciated that although FIG. 8 illustrates a number of steps according to at least one embodiment, the precise steps and/or order of steps may vary in different embodiments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example and is not mandatory; functions performed by a single system component may instead be performed by multiple components, and functions performed by multiple components may instead performed by a single component. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. For example, the non-transitory computer readable storage medium, may include examples such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

Furthermore, any computing systems referred to in the specification may include a single processor or may be architectures employing multiple processor designs for increased computing capability. Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
  generating, by a computing system, an extended reality environment for an end user, the extended reality environment comprising a plurality of tasks associated with the end user;
  receiving, by the computing system, input data from an extended reality system associated with the end user, the input data comprising one or more event data associated with actions taken by the end user in the extended reality environment;
  determining, by the computing system, one or more conversational interventions in the extended reality environment in accordance with one or more triggering events by:
    i) setting one or more triggering criteria for each of the one or more event data associated with actions taken by the end user in the extended reality environment, and
    ii) determining whether a current learning state associated with the end user is below a threshold value of the one or more triggering criteria;
  receiving, by the computing system, a voice command from the end user, wherein the voice command corresponds to a statement uttered by the end user within the extended reality environment;
  processing, by the computing system, the voice command to generate a response to the voice command; and
  causing, by the computing system, the response and the one or more conversational interventions to appear within the extended reality environment as an audible response to the voice command.

2. The method of claim 1, wherein the plurality of tasks comprises one or more required tasks and one or more optional tasks different from the one or more required tasks.

3. The method of claim 1, wherein the one or more triggering criteria further comprises at least one of: one or more levels of engagement of the end user, one or more levels of subskill mastery of the end user, and one or more levels of completion of the plurality of tasks associated with the end user.

4. The method of claim 1, wherein the extended reality environment comprises one or more additional tasks different from the plurality of tasks, each of the one or more additional tasks appearing within the extended reality environment.

5. The method of claim 4, wherein the one or more additional tasks appearing within the extended reality environment comprises at least one of one or more audible directions, one or more animations, and one or more rendering of models associated with the activities taken by the end user.

6. The method of claim 1, wherein the extended reality environment further comprises one or more questions asked to the end user, each of the one or more questions appearing within the extended reality environment.

7. The method of claim 1, wherein the one or more event data associated with actions taken by the end user in the extended reality environment is determined based on the generated response to the voice command.

8. The method of claim 1, wherein determining one or more conversational interventions in the extended reality environment in accordance with the one or more triggering events is based on determining whether one of the plurality of tasks performed by the end user in the extended reality environment was successfully completed in comparison with the received input data from the external reality system.

9. The method of claim 1, wherein the one or more conversational interventions further comprises one or more conversational assessments appearing within the extended reality environment.

10. A non-transitory computer-readable storage medium storing instructions that when executed by a processor of a computing system perform actions comprising:
- generating an extended reality environment for an end user, the extended reality environment comprising a plurality of tasks associated with the end user;
- receiving input data from an extended reality system associated with the end user, the input data comprising one or more event data associated with actions taken by the end user in the extended reality environment;
- determining one or more conversational interventions in the extended reality environment in accordance with one or more triggering events by:
  - i) setting one or more triggering criteria for each of the one or more event data associated with actions taken by the end user in the extended reality environment, and
  - ii) determining whether a current learning state associated with the end user is below a threshold value of the one or more triggering criteria;
- receiving a voice command from the end user, wherein the voice command corresponds to a statement uttered by the end user within the extended reality environment;
- processing the voice command to generate a response to the voice command; and
- causing the response and the one or more conversational interventions to appear within the extended reality environment as an audible response to the voice command.

11. The non-transitory computer-readable storage medium of claim 10, wherein the plurality of tasks comprises one or more required tasks and one or more optional tasks different from the one or more required tasks.

12. The non-transitory computer-readable storage medium of claim 10, wherein the one or more triggering criteria further comprises at least one of: one or more levels of engagement of the end user, one or more levels of subskill mastery of the end user, and one or more levels of completion of the plurality of tasks associated with the end user.

13. The non-transitory computer-readable storage medium of claim 10, wherein the extended reality environment comprises one or more additional tasks different from the plurality of tasks, each of the one or more additional tasks appearing within the extended reality environment.

14. The non-transitory computer-readable storage medium of claim 13, wherein the one or more additional tasks appearing within the extended reality environment comprises at least one of one or more audible directions, one or more animations, and one or more rendering of models associated with the activities taken by the end user.

15. The non-transitory computer-readable storage medium of claim 10, wherein the extended reality environment further comprises one or more questions asked to the end user, each of the one or more questions appearing within the extended reality environment.

16. The non-transitory computer-readable storage medium of claim 10, wherein the one or more event data associated with actions taken by the end user in the extended reality environment is determined based on the generated response to the voice command.

17. The non-transitory computer-readable storage medium of claim 10, wherein determining one or more conversational interventions in the extended reality environment in accordance with the one or more triggering events is based on determining whether one of the plurality of tasks performed by the end user in the extended reality environment was successfully completed in comparison with the received input data from the external reality system.

18. The non-transitory computer-readable storage medium of claim 10, wherein the one or more conversational interventions further comprises one or more conversational assessments appearing within the extended reality environment.

* * * * *